(12) United States Patent
Kahl

(10) Patent No.: US 6,459,718 B1
(45) Date of Patent: Oct. 1, 2002

(54) LASER PROTECTIVE WALL

(75) Inventor: Helmuth Kahl, Porta Westfalica (DE)

(73) Assignee: Paletti Profilsysteme GmbH & Co., Minden (DE)

( * ) Notice: Subject to any disclaimer, the term of this patent is extended or adjusted under 35 U.S.C. 154(b) by 0 days.

(21) Appl. No.: 09/600,143

(22) PCT Filed: Nov. 12, 1999

(86) PCT No.: PCT/EP99/08749

§ 371 (c)(1),
(2), (4) Date: Jul. 12, 2000

(87) PCT Pub. No.: WO00/29778

PCT Pub. Date: May 25, 2000

(30) Foreign Application Priority Data

Nov. 12, 1998 (DE) .......................................... 198 52 118
Dec. 3, 1998 (DE) .......................................... 198 55 793

(51) Int. Cl.⁷ .............................................. H01S 3/097
(52) U.S. Cl. ......................................... 372/87; 372/92
(58) Field of Search ...................................... 372/92, 87

(56) References Cited

U.S. PATENT DOCUMENTS

| | | | | |
|---|---|---|---|---|
| 3,991,385 A | * | 11/1976 | Fein et al. | 372/87 |
| 4,017,808 A | * | 4/1977 | Fein et al. | 372/87 |
| 4,085,385 A | * | 4/1978 | Fein et al. | 372/87 |
| 4,101,846 A | * | 7/1978 | Fein et al | 372/87 |
| 4,122,411 A | * | 10/1978 | Fein et al. | 372/87 |
| 4,659,902 A | | 4/1987 | Janosik et al. | |
| 4,730,113 A | | 3/1988 | Edwards et al. | |

FOREIGN PATENT DOCUMENTS

DE     196 29 037 C     7/1997

* cited by examiner

*Primary Examiner*—Leon Scott, Jr.
(74) *Attorney, Agent, or Firm*—Browdy and Neimark, P.L.L.C.

(57) ABSTRACT

The invention relates to a laser protective wall which consists of at least one metallic surface-treated sheet metal wall (W1*–W6*), wherein the metallic walls (W1* –W6*; S1, S2) consist of anodized or chromalized light metal.

19 Claims, 4 Drawing Sheets

LASER PROTECTIVE WALL

CROSS REFERENCE TO RELATED APPLICATION

The present application is the national stage under 35 U.S.C. 371 of PCT/EP99/08749, filed Nov. 12, 1999.

BACKGROUND OF THE INVENTION

1. Technical Field of the Invention

The present invention relates to a laser protective wall comprising at least one metallic surface-treated thin sheet metal wall.

2. Prior Art

From DE 196 29 037 C1, laser protective walls are known that serve to shield laser work stations, especially against high-power metal-working lasers, in such a way that the protective walls comprise parallel, spaced-apart sheets of metal, the surfaces of which that face the laser are provided with a light-absorbing coating. The metal sheets are held in place by a framework structure within which the metal sheets are designed self-supporting, which, depending on the size of the wall, necessitates a considerable thickness of the sheet metal. Experiments have shown that the absorbing color coat, in particular also a graphite coating, hardly presents a significant obstacle for a laser beam.

OBJECT AND SUMMARY OF THE INVENTION

It is the aim of the invention to reveal a significantly more effective laser protective wall with the same or a lesser wall thickness.

This aim is met in such a way that the metallic walls are made of anodized or chromalized light metal.

Surprisingly, extensive experiments have shown that an anodized coating or chromalized coating on a light metal part produces a substantial increase in the burn-in and burn-through times of a laser beam and, with a low-energy laser beam, or a laser beam that has been weakened by dispersion, prevents a penetration of the beam altogether. Furthermore, an anodized coating on the exit side increases the dispersion of a penetrated laser beam, so that its penetration power at a subsequent wall is weakened accordingly.

The framework structure that frames and/or laterally supports the metallic sheet metal walls is preferably also made of anodized light metal. A light metal profile material has proven suitable that has many differently angled interior webs and interspersed hollow spaces. Into these, connecting elements can be inserted, which are held in a removable manner by means of a snap-in connection, if the outer walls have grooves that expand towards the inside. Grooves of this type are preferably provided on all sides, so that it is also possible to form corners with multi-layered sheet metal walls on the support profiles.

Furthermore, a wall construction will be revealed that is simpler and more variably adaptable to different work environments.

This wall is formed of extruded light metal profiles that are closely lined up side-by-side, of which a wall or at least a continuous partial wall is assembled of lined-up light metal hollow profiles, which are designed with multi-staggered, thin-walled, multi-angled interior structures while leaving most of the intermediary hollow spaces.

Comprehensive experiments have shown that a weakening of the area-specific beam intensity hardly ever occurs in the interior of a metal sheet but particularly on the given exit side of a penetrated sheet metal wall, due to a divergent widening of the beam.

The novel protective wall can be used successfully especially if the protective wall must be arranged close to the laser focus where, for example, a 4 kW laser has a diameter of 0.4 mm. If only a partial wall is constructed of the hollow profile elements, and if their respective joint areas are bridged, the multi-angled interior structures produce four or more walls in each direction, through which a penetrating beam is dispersed on the respective exit sides until it is weakened to the point that it no longer has any penetration power.

The individual hollow profile elements and exterior flat profile elements are assembled as needed, with overlapping joints. Multiple layers of hollow profile elements may be arranged one behind the other, if required, and the exterior surfaces are lined with the flat profile sheets.

The individual profile elements are provided with joints that expand toward the inside, which are located opposite one another when the profile elements are arranged side-by-side and/or offset one behind the other. Form-fit tongue-profile strips are then inserted into the joints when a connection is to be made. The tongue-profile strips may also be integral, in which case the respective grooves and tongues are formed complementary, which permits a problem-free side-by-side alignment and arrangement in layers one behind the other.

The exterior flat profile elements are preferably provided with bracing spring strips, which are pushed into the grooves of the hollow profiles where they interlock in a removable manner.

A beam-dispersing space is also formed between the flat profile element and the hollow profile element, since a spacer, which is supported on the hollow profile, is formed at the end of each flat profile.

The individual hollow profiles are preferably substantially rectangular on the outside and have a height-width ratio of 1 to 2, so that a nested wall construction with a constant thickness can also be accomplished without special profiles in square wall corners. This method of construction is assisted by the fact that the grooves on the short profile sides have the same distance from the corner as the grooves on the long sides of the profile.

BRIEF DESCRIPTION OF THE DRAWINGS

Advantageous embodiments will be described with the aid of the FIGS. 1 through 4.

DETAILED DESCRIPTION OF THE PREFERRED EMBODIMENT(S) OF THE INVENTION

Figure 1:
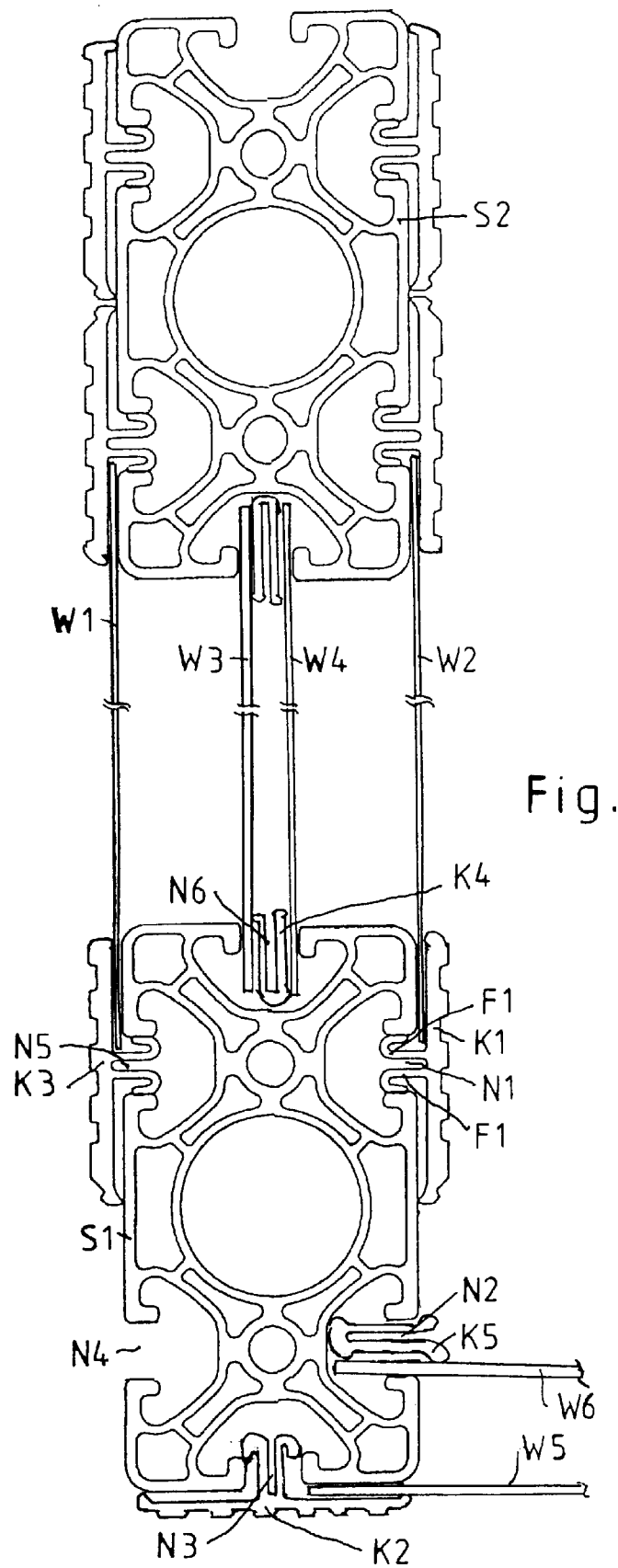
FIG. 1 shows a cross section through a first embodiment of a wall structure according to the invention in a corner area, with the walls shown shortened.

The design of the laser protective wall according to FIG. 1 comprises anodized light metal supports S1, S2, which may also be joined in a frame-like manner—which is not shown in the drawing—with one or more cross connectors of the same type, and one or more walls W1–W4 of anodized light sheet metal inserted between them. The wall thickness of the sheets may, for instance, be 1 mm. Their thickness is determined on one hand by the necessary stability of the wall, and also by the required thermal conduction, which must be sufficient to laterally dissipate, through the high melting anodized coating, the heat absorbed from a laser beam of the maximum intensity for which the wall must provide protection, so that the melting point of the anodized coating and the evaporating point of the light metal are not reached. The mechanical stability of the sheet metal may be increased in a known manner with a corrugated-sheet-like profile, which is not shown.

In cases in which protection is required only from an area-specific low-energy laser beam, e.g., in the case of a larger distance of the wall from the focal point, where the beam has already many times the focal point diameter, it is sufficient to have one sheet metal wall W1. For higher specific beam powers, one or more additional walls W2–W4 are used. The supports S1, S2 have longitudinal grooves N1–N6 on all sides, which open toward the inside and in which clamping strips K1–K5, which hold the wall sheets W1–W6 on the supports in a frictional connection, are held removably with a snap-in connection.

The vertical members S1, S2 are preferably thin-walled extruded profile bars of a rectangular profile, wherein the height-width ratio is preferably an even number, e.g., two to one, and the grooves N1–N6 are arranged correspondingly, so that single-layer or multiple-layer walls can be built in the same manner also around a corner constructed with vertical members The clamping parts K1, K2, K3 are substantially flat, anodized or chromalized extruded light metal strips, the width of which corresponds approximately to the width of the narrow edges of a support S1. The clamping pieces have a spring F1 that expands on both sides in a hook-like fashion, which hooks into the groove N1, N3, N5 in a removable connection. The flat lateral strips cover the edge areas of the wall sheets that sit against the outside of the vertical members.

The interior wall sheets W3, W4 are held in place by clamping strips K4, K5 with a stirrup-shaped cross section, which are inserted before the wall sheets W3, W4, W6 are placed into the groove N2, N6, and each of which holds one wall sheet W3, W4, W6 laterally to the groove wall in a clamp-in type connection, or holds a wall sheet inside, between the clamping arms.

The clamping strips K1–K5 too are preferably made of anodized extruded light metal.

Inside the support S1, S2, the multi-layer cross webs with their intermediary hollow spaces ensure, also due to their anodized coatings, that no laser beam can break out of the protective walls through these cross webs either. The number of sheet walls W1–W4; W5, W6 that are arranged at an angle, is selected differently in the given example, which is permissible when they have different distances to the laser beam focus, and the specific beam power, against which protection is to be provided, is thus different.

Figure 2:
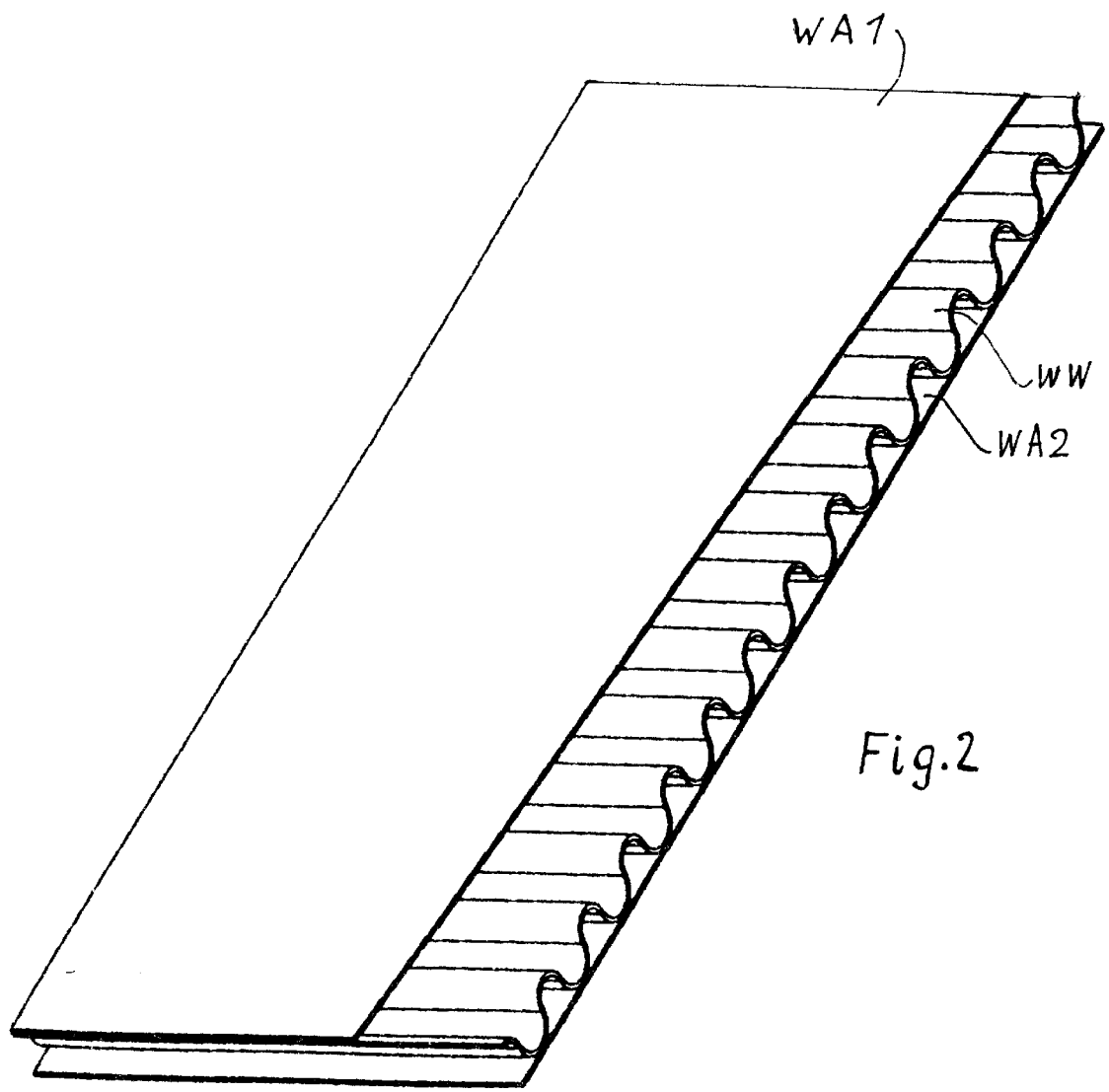
FIG. 2 shows a composite layer construction of a second embodiment of a wall according to the invention.

FIG. 2 shows, with a partially removed finishing wall, a stable three-layer composite wall of anodized or chromalized light metal with a corrugated inside wall WW sandwiched-in and welded-in between two flat finishing walls WA1, WA2.

Figure 3:
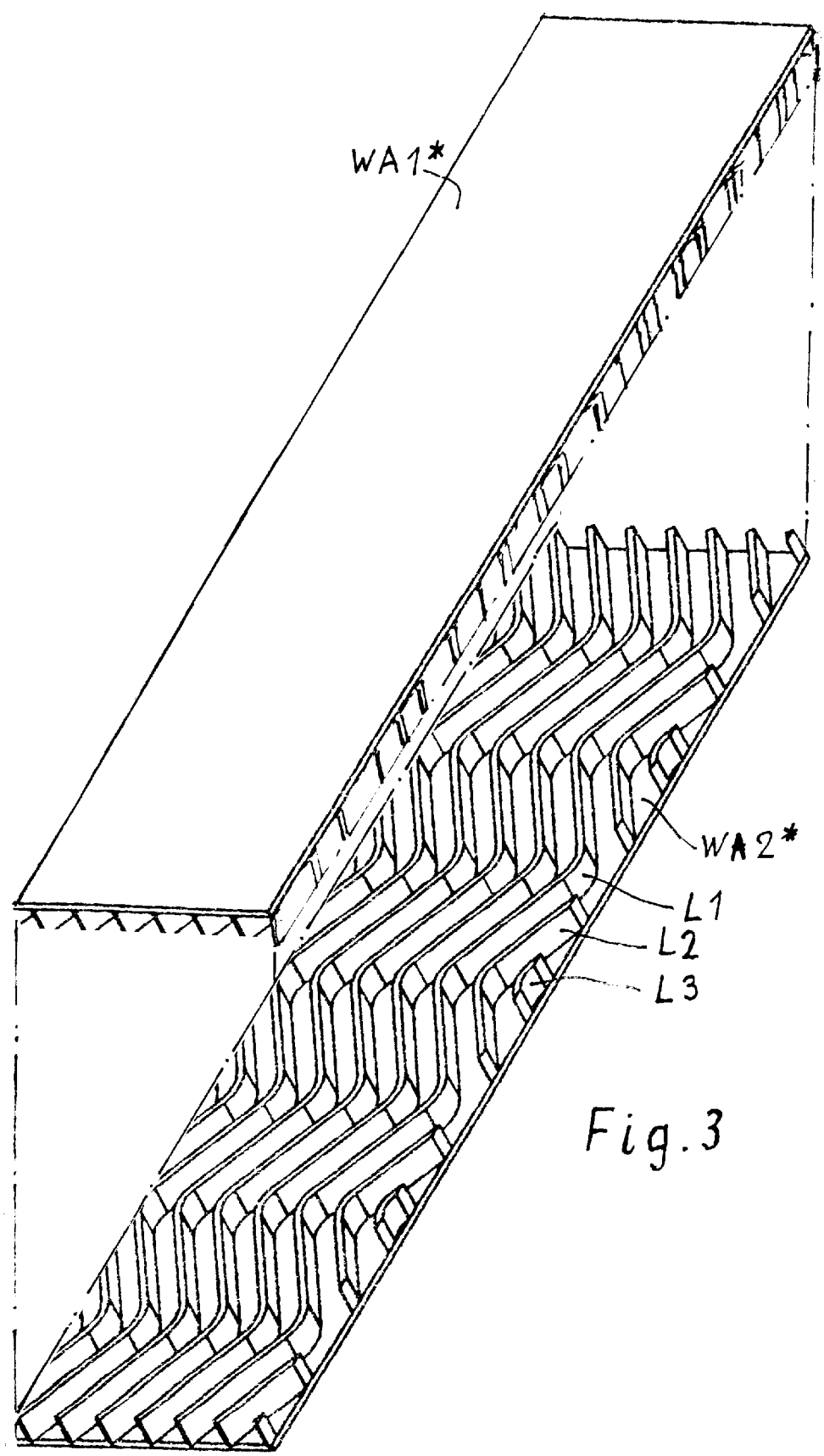
FIG. 3 shows a lamellar construction of a third embodiment of a wall according to the invention.

FIG. 3 shows, in a shortened form, partially cut open, a further variation of a self-supporting light metal wall wherein corrugated lamella-type strips L1, L2, L3, are arranged parallel to one another between flat finishing walls WA1*, WA2*. Wall units of this type can be combined side by side at random.

Figure 4:
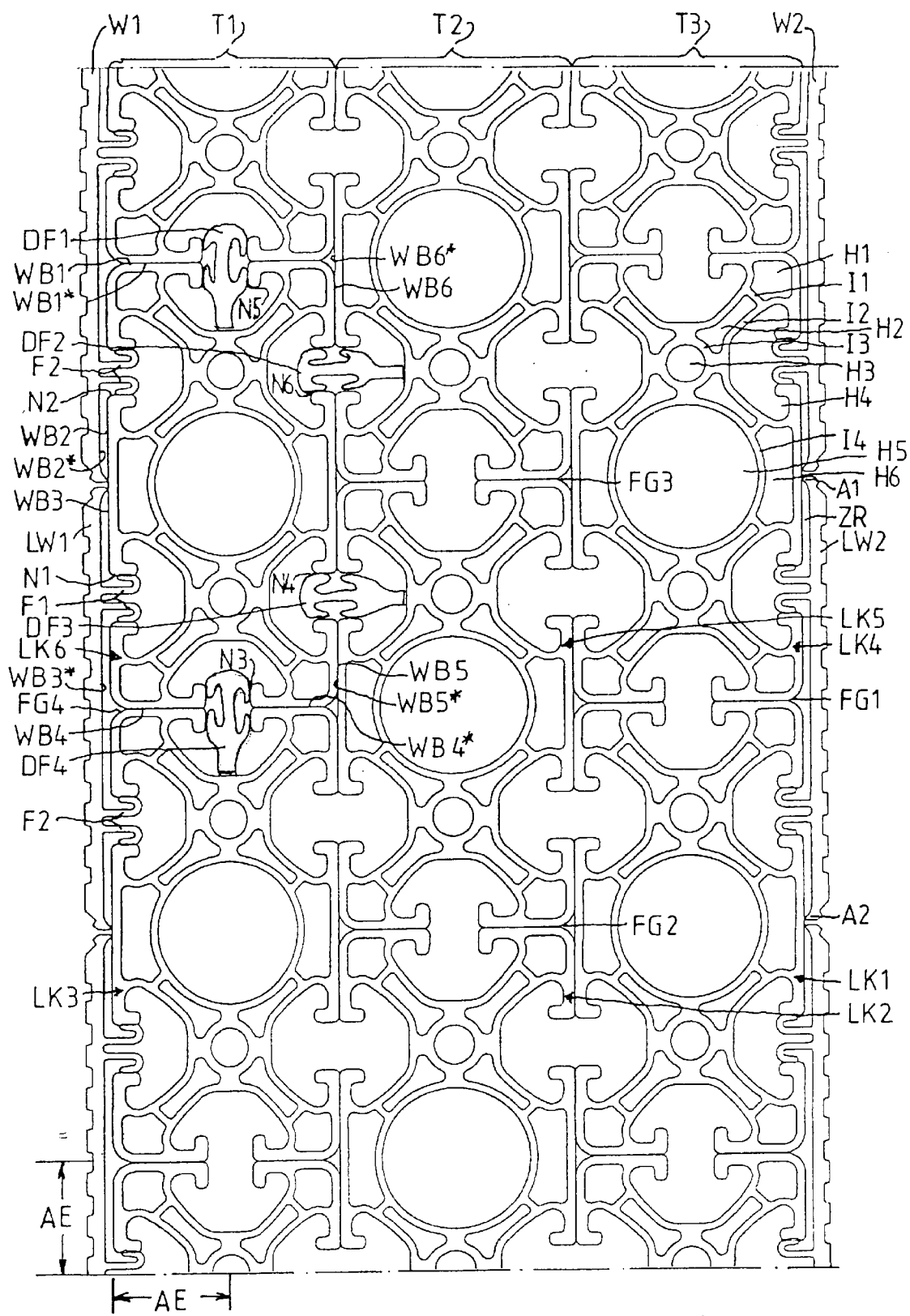
FIG. 4 shows a modular construction of a fourth embodiment of a wall according to the invention made of profile material.

FIG. 4 shows in a cross section through the profiles of a segment, a protective laser wall that meets even stringent demands. It is assembled of three closely spaced successive partial protective walls T1–T3 made of identical extruded hollow profiles LK1–LK6 with interior structures made of extruded light metal and lined on the outside with walls W1*, W2* of substantially flat extruded profiles LW1, LW2.

Inside the hollow extruded profiles Lk1, thin multi-angled interior walls I1–I4 are formed in differently slanting arrangements, so that hollow spaces H1–H6 of different shapes are formed between them.

The joints FG1–FG4 between the hollow profiles LK1–LK6 are arranged offset from one another in the perpendicular direction of the three partial walls T1–T3, as well as from the flat profiles (LW1, LW2).

As shown in one partial area, the wall areas WB1–WB6 of the profiles LK6 are provided longitudinally with grooves N1*–N6*, which are located parallel in front of matching grooves or tongues F1, F2 of the adjacent wall areas WB1*–WB6* of the wall elements, so that integral tongues F1, F2 or inserted double springs DF1–DF4 create form-fitting connections from wall element to wall element.

The springs F1, F2 and/or the double springs DF1–DF4 are advantageously designed as bracing springs with two arms, so that they engage into the grooves N1*–N6*, which expand towards the inside, in a removable, form-fitting manner, and preferably snap into them in a removable manner.

The exterior flat profile elements LW2 are provided, at both ends, with a spacer web A1, A2, so that each of the flat wall profile elements is spaced apart from the adjacent hollow profile element LKI, LK4 mostly by an intermediary space ZR that disperses the possibly penetrating laser light.

The hollow profile elements LK1–LK6 are preferably designed substantially rectangular and have a whole-number height-width ratio that is larger than 1. The shown profiles have a height-width ratio of 2 to 1. The grooves N1*, N2* on the adjacent sides each have the same distance AE from the corner. With this design, square wall corners can be implemented completely with offset joints and in tongue-and-groove construction by adding on farther profile elements of the same type, as appropriate.

If tongues and grooves are implemented on the different profile elements, which is not shown, they are advantageously formed alternating on the circumference, so that the same type of hollow profiles and flat profiles can always be used, also to construct a wall corner.

What is claimed is:

1. A wall for shielding a work station within which a laser beam is produced having at least one light sheet metal wall engaged to thin-walled light metal extruded profile bars, wherein the metal wall and the profile bars each have surfaces facing the laser beam which have been anodized or chromalized.

2. The wall as set forth in claim 1, wherein a support structure or framework structure is formed from the profile bars, to which one or more of the metal walls are fixed.

3. The wall as set forth in claim 1, wherein one or more of the metal walls are corrugated.

4. The wall as set forth in claim 3, wherein the profile bars have longitudinal grooves in which the metal walls are respectively engaged alone or by first clamping strips respectively inserted in the grooves to engage the metal walls against a wall of the groove or by second clamping strips which respectively hold the metal walls directly against an outside wall of the profile bars.

5. The wall as set forth in claim 4, wherein the first and second clamping strips are produced from a light metal which has been anodized.

6. The wall as set forth in claim 4, wherein the second clamping strips are substantially a flat strip having a spring connection that extends perpendicular thereto which can be removably snapped into the groove.

7. The wall as set forth in claim 4, wherein the first clamping strips can be inserted into the groove to engage an inserted metal wall by pressing the metal wall against a groove wall on one side, or press two wall sheets against opposite groove walls.

8. The wall according to claim 1, wherein the profile bars have a plurality of interior walls which produce intermediary hollow spaces therebetween.

9. The wall as set forth in claim 3, wherein the corrugated wall is embedded between flat finishing walls.

10. A wall for shielding a work station within which a laser beam is produced comprising a line of light metal profile bars which have intermediary hollow spaces and have surfaces which have been anodized or chromalized.

11. The wall as set forth in claim 10, wherein a plurality of partial walls is formed by a line of profile bars which are arranged to abut each other with offset profile element joints.

12. The wall as set forth in claim 11, wherein the profile bars each have groves in an adjacent wall area that extend laterally, wherein the profile bars are engaged together by a clamping strip having two spring connections respectively engaged in a groove of the adjacent wall area.

13. The wall as set forth in claim 12, wherein the grooves and spring connections each are arranged opposite another in pairs, or parallel and interlocking, and the profile bars are directly or indirectly connected by means of a groove-and-tongue connection.

14. The wall as set forth in claim 12, wherein the grooves on adjacent sides of the profile bars are spaced away from a corner of profile bars a same distance on an exterior of the profile bars.

15. The wall as set forth in claim 10, wherein at least one exterior wall is formed of light metal flat profiles, which are attached to an adjacent partial wall with at least one groove-and-tongue connection in an interlocking connection.

16. The wall as set forth in claim 15, wherein the light metal flat profiles respectively overlap joints of adjacent profile elements.

17. The wall according to claim 16, wherein the light metal flat profiles have integral narrow spacer webs formed on ends thereof which engage adjacent profile bars and create a space (ZR) between the flat profiles and the profile bars.

18. The wall as set forth in claim 10 the profile bars are substantially rectangular on an outside thereof and a height-width ratio thereof is a whole number.

19. The wall as set forth in claim 18, wherein the height-width ratio is 1 to 2.

\* \* \* \* \*